April 10, 1934.  L. M. KEIGHLEY  1,954,134
REFRIGERATING APPARATUS
Original Filed Sept. 30, 1931   2 Sheets-Sheet 1

INVENTOR
Lloyd M. Keighley
BY
Spencer, Wardman, and Fale.
HIS ATTORNEYS.

Patented Apr. 10, 1934

1,954,134

UNITED STATES PATENT OFFICE 1,954,134

REFRIGERATING APPARATUS

Lloyd M. Keighley, Dayton, Ohio, assignor to Frigidaire Corporation, Dayton, Ohio, a corporation of Delaware Application September 30, 1931, Serial No. 565,946
Renewed June 26, 1933

11 Claims. (Cl. 62—4)

This invention relates to refrigerating apparatus and particularly to apparatus for and methods of controlling such apparatus.

This invention is particularly directed to refrigerating systems of the type in which operations of the refrigerant liquefying and circulating unit are controlled in response to the conditions of the refrigerating fluid contained in the system. A typical example of such a refrigerating system is the compressor-condenser-expander type of system in which a control device, responsive to the pressure of the refrigerant in the system, is employed to control starting and stopping of the means for driving the compressor of the system. Another example of such a refrigerating system is the absorption type of system in which a control device, responsive to pressures of the refrigerant in the system, is utilized to control the heating and cooling cycles of operation of the system or the amount of heat or cooling fluid being supplied to certain elements thereof.

In refrigerating systems of the type exemplified the control device employed therein is normally set to operate between certain pressure limits. Since pressures of refrigerating fluids normally increase or decrease uniformly and correspondingly with temperatures thereof, the control device of such a refrigerating system causes the system to maintain the temperature of the evaporator thereof between predetermined limits. Should the temperature outside the compartment of the refrigerator in which the evaporator is located, increase abnormally, or should water or comestibles to be frozen be placed in the evaporator, the control of the system will cause operator of the refrigerant liquefying and circulating unit until it has reduced the evaporator to the normal low pressure and consequently to the normal low temperature limit at which it is set and will then stop operation of the unit. Since heat is being transferred to the evaporator more rapidly than during normal conditions the pressure of refrigerant in the system will again rise very quickly, thus again causing the control switch to start operation of the unit. It is apparent that under such conditions the refrigerant liquefying and circulating unit will cycle very frequently and will reduce the evaporator and consequently the compartment being cooled thereby only to the temperature corresponding to the low pressure at which the control is set to stop operation of the unit. This frequent starting and stopping of the refrigerant liquefying and circulating unit causes abnormal wear on the control switch and all other operating elements of the system thus necessitating their replacement or repair after the system has been in operation for a short period of time.

The object of the present invention is to provide an improved refrigerating system which normally maintains the desired refrigerating temperature in a compartment for general refrigerating purposes and which will provide increased or decreased cooling automatically when it is desired, such as when temperatures on the exterior of the refrigerating compartment increases or decreases abnormally or when water or comestibles are placed in the evaporator of the system to be congealed or frozen.

In carrying out this object, it is a further object to control the refrigerating system normally in response to normal requirements of the system and to control the system to provide increased cooling in direct response to abnormal increases in temperature outside the compartment being refrigerated and in direct response to a substance, such as water, which is to be frozen quickly.

Another object of the invention is to provide an improved control system for a refrigerating machine, the controlling system including a combination of means operable independently of one another in response to various climatic conditions for automatically effecting the operation of such system.

Further objects and advantages of the present invention will be apparent from the following description, reference being had to the accompanying drawings, wherein a preferred form of the present invention is clearly shown.

Figure 1:
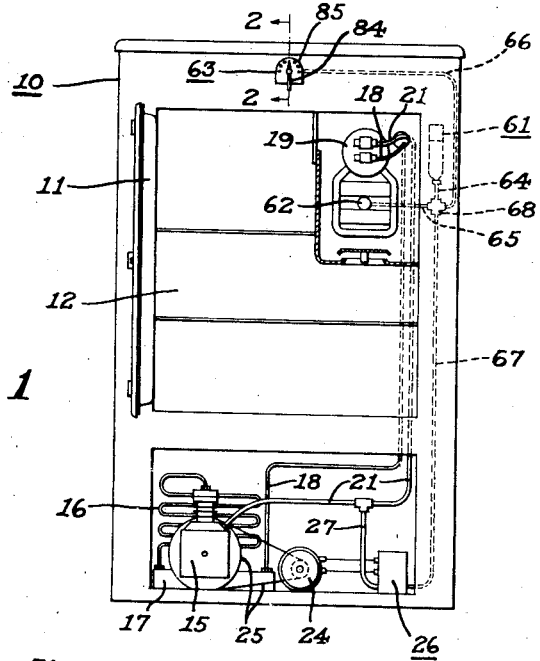
Fig. 1 shows a mechanical refrigerating apparatus installed in a cabinet and having my invention embodied therein.
Figure 3:
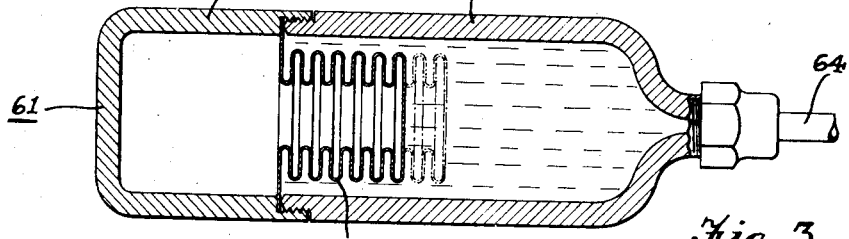
Fig. 3 is an enlarged sectional view of a thermostatic element employed in the system to automatically modify the action of the control switch of the system in response to temperature changes.

For the purpose of illustration, I have shown in the drawings a refrigerating system of the compressor-condenser-expander type. My invention is, however, equally applicable to other types of systems such as absorption refrigerating systems as hereinbefore pointed out. Referring to the drawings, Fig. 1 discloses a refrigerating system installed in a refrigerator cabinet 10 of the household type. The door 11 which permits access to the insulated storage compartment 12 to be refrigerated being shown in open position. The door or front cover employed to enclose the refrigerant liquefying unit of the system in a lower compartment of the cabinet 10 is shown as being removed from the cabinet. The refrigerating system includes a compressor 15 for compressing the refrigerant, preferably sulphur dioxide, and for forwarding it to a condenser 16 where it is liquefied and collected in a receiver 17. A supply conduit 18 supplies liquid refrigerant from the receiver 17 to a cooling unit or evaporator 19, disposed in the insulated compartment 12 to be refrigerated, where the liquid refrigerant vaporizes because of the absorption of heat from the compartment and is returned to the compressor 15 through a gaseous refrigerant return conduit 21. The evaporator 19 may be of any suitable form, such for example, as that shown in the patent to R. G. Osborn, 1,556,708 issued October 13, 1925. Liquid refrigerant entering the evaporator 19 through conduit 18 is maintained at a substantially constant level therein by a float control valve substantially as shown in said patent to Osborn.

The actuating means for the compressor 15 preferably comprises an electric motor 24 connected by pulley and belt means 25 to the compressor. Pressure responsive control mechanism 26 is connected to the gaseous refrigerant return conduit 21 through the conduit 27 for opening and closing the electric circuit leading to the motor 24 which drives the compressor 15 to provide alternating operating and idling periods of the compressor according to the pressure of the refrigerant in and consequently to temperature of the evaporator 19.

The pressure responsive means of the control mechanism 26 comprises a hollow metallic bellows 29 (see Fig. 4) which is sealed at the top and which is connected at the bottom by means of the conduit 27 to the return conduit 21 of the refrigerating system. An operating lever 32 pivoted on ears 33 of the elevated platform 34 follows the movements of the bellows 29 by being pivoted thereto by a pin 35. A double lever 36 straddles the lever 32 and is pivoted thereto by the pin 37. One end of the lever 32 is connected to one of the switch contacts 38 by a link 39. The cooperating switch contact 41 is mounted on the base 42 of the control mechanism. A snap action of the contact 38 with respect to the contact 41 is provided by a cam system which includes a hardened steel nose 44, fastened to the other end of the lever 36, against which a hardened steel roller 45 is biased by a carrier 46 and a spring 47. As the pressure builds up within the flexible metallic bellows 29, the latter expands and since the lever 32 is pivoted to this bellows by the pin 35 and fulcrumed to the supporting frame of the device as at 33, it is evident that the bellows will raise the operating lever 32.

The upward movement of the lever 32 is resisted by a yieldable adjustable system comprising a coil spring carried within an adjustable casing 49 and bearing against a plunger 51 which acts against the extremity 52 of the lever 32. When the pressure decreases and the bellows 29 collapses, the downward movement of the lever will be resisted by a coil spring 54 whose tension may be regulated by nuts 55 carried on a vertical threaded rod 56 pivoted to lever 32. A balancing spring 57 adjusted by the nuts 58 is used on the opposite side of the base 42 of the device for resisting the tension of the spring 54.

The springs 54 and 57 and the resilient adjusting system comprising the plunger 51 and the adjusting cap 49 are provided for preferably so adjusting to produce what may be termed a normal predetermined adjustment, that is for maintaining a pressure corresponding to a particular temperature which is ordinarily suitable under normal conditions for every day operation of the evaporator in which the system is used.

The extremity 52 of the lever 32 bears against the plunger 51 only on the upward action of lever 32. After lever 32 begins to descend the extremity 52 does not touch the plunger 51. Thus the plunger 51 effects the starting pressure but not the stopping pressure. The cap 49 is therefore a starting adjustment. The temperature provided by the mechanism thus described is sufficient to cool to the desired temperature foodstuffs ordinarily stored in the compartment of the cabinet cooled by the evaporator. The pressure responsive control mechanism including the parts heretofore described is substantially identical to the control mechanism disclosed in the patent to Otto M. Summers, No. 1,802,486 issued April 28, 1931.

Since it is desirable to cause longer operating periods of the refrigerant liquefying and circulating unit instead of a plurality of short operating periods to reduce the temperature of the evaporator, and consequently the compartment in which it is mounted, below their normal low temperature limit in the event temperatures increase abnormally on the exterior of the cabinet or in the event the evaporator increases in temperature abnormally, I have provided means for modifying the operation of the refrigerant liquefying unit. In the present embodiment, I modify the action of the control means to effect modification of operation of the refrigerant liquefying and circulating unit. The control means is usually adjusted at the factory, or in the field by experienced service men, for such normal operation by suitably tensioning the springs 54 and 57 as well as the resilient adjusting system 49 and 51 and in such condition the lever 32 will have its upward and downward movement resisted so that it will open and close the circuit of the driving motor 24 only at the maximum and minimum pressure temperature points for which the tension corresponds.

By interposing a resistance to the descent of the lever 32, the operation of the switch contacts will be delayed so that the system will continue operating for a longer period of time, thus prolonging the cooling cycle of the system. Likewise, if the resistance to the descent of the lever 32 is increased, it will require a greater effort on the part of the diaphragm 29 to pull the lever down into contact breaking position. (The descent of the lever 32 causing the raising of contact 38 away from the contact 41, thus breaking the circuit).

Figure 2:
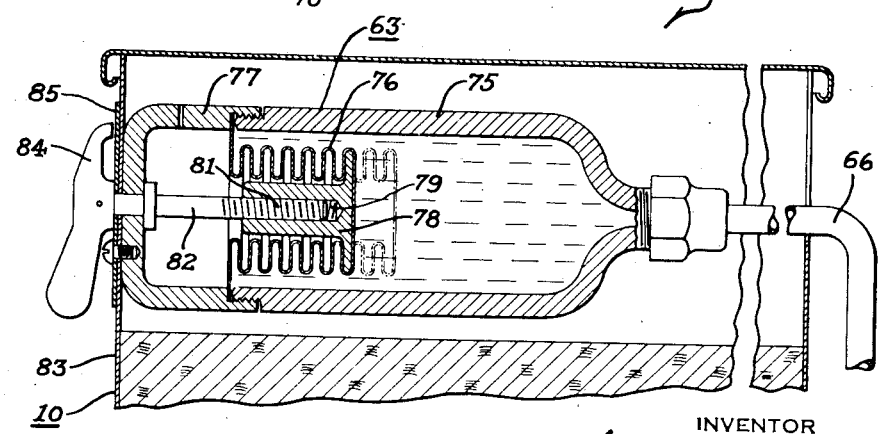
Fig. 2 is an enlarged sectional view taken on the line 2—2 of Fig. 1 showing a manually actuated device for modifying the action of the control switch of the system.

According to the present invention, the system for modifying the action of the control switch or for interposing such a resistance to the control switch includes two automatic thermostat bulbs 61 and 62 (see Fig. 1) and a manually operated means 63 (see Fig. 2). Thermostat bulb 61 is disposed preferably on the back wall of cabinet 10 so as to be responsive to temperatures outside the compartment 12 being refrigerated. Thermostat bulb 62 is located in the evaporator 19 and contacts with sleeves in this evaporator which sleeves are adapted to receive trays containing water or other substances to be congealed or frozen. Each of the foregoing mentioned elements are connected by conduits 64, 65 and 66 respectively with a conduit 67 by the coupling member 68. The thermostat bulbs 61 and 62 are preferably circular in cross section and may be identical in form. They include an expansible and contractible metallic bellows 70 clamped between housing 71 and housing 73. Bellows 70 divides the thermostats 61 and 62 into two compartments one of which is connected with conduit 64 and is adapted to receive a non-freezing fluid to be hereinafter more fully described. The other compartment, formed in thermostats 61 and 62 by bellows 70, is adapted to contain a temperature responsive fluid or medium and therefore provids a temperature responsive bulb in each of the thermostats 61 and 62 for moving the bellows 70. The conduits 64 and 65 of the respective bulbs are secured to housing 73. Any suitable volatile fluid which vaporizes and liquefies or expands and contracts due to temperature changes thereof may be employed in the thermostat bulbs 61 and 62. Any suitable method may be employed for filling or charging the bulbs 61 and 62 with the volatile fluid to be used therein. Such method or methods are not believed to require a detailed description herein.

The manually actuated means 63 includes a housing 75 having a bellows 76 sealed thereto by a cap member 77 (see Fig. 2). Bellows 76 has a member 78 secured to its inner end which member is threaded as at 79 to receive a threaded end 81 of a rod 82. Rod 82 extends through cap member 77 and wall 83 of cabinet 10 and has a pointer or handle 84 secured thereto which handle is accessible from the exterior of the cabinet. The pointer or handle 84 communicates with a dial 85 secured to wall 83. Housing 73 of each of the thermostat elements 61 and 62 and housing 75 of the manually operated element 63 are filled with any suitable non-freezing fluid such as glycerin or the like which does not expand or contract materially during temperature changes thereof. The conduits 64, 65 and 66 leading from each of the elements and conduit 67 together with an auxiliary bellows 87 fastened on base 42 of control switch 26 (see Fig. 4) and connected to conduit 67 are likewise filled in any suitable manner with this fluid. The fluid in bellows 87, housings 73 and 75, conduits 64, 65, 66 and 67 thereby provides means for hydraulically transmitting movement of the thermostats 61 and 62 to the control switch 26.

Figure 4:
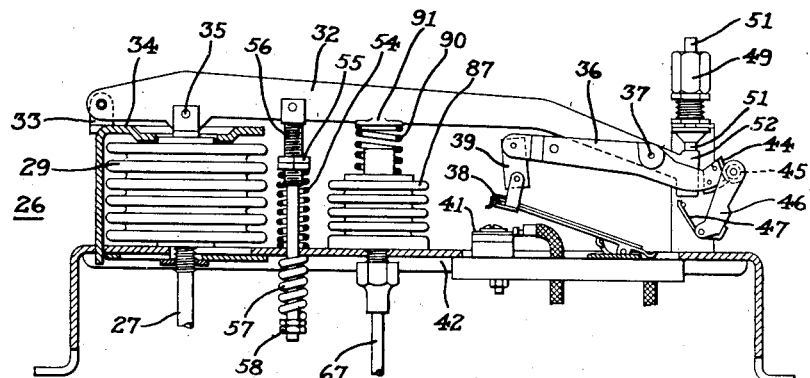
Fig. 4 is a sectional view of a control switch taken on the line 4—4 of Fig. 6 illustrating one embodiment of the invention to which the elements shown in Figs. 2 and 3 are adapted to be connected.
Figure 5:
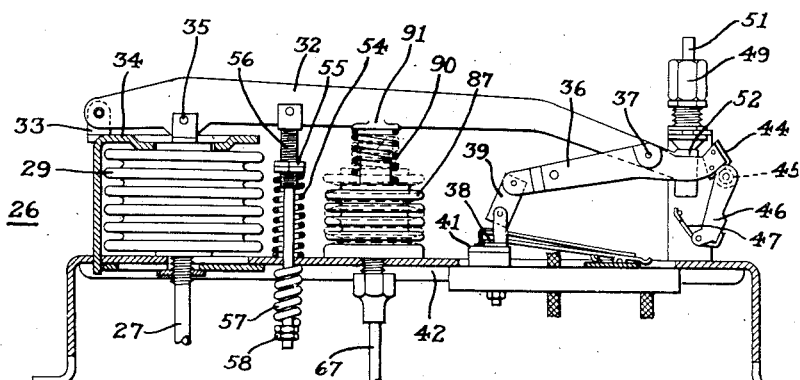
Fig. 5 is a sectional view of the control switch disclosed in Fig. 4 shown in a different position.
Figure 6:
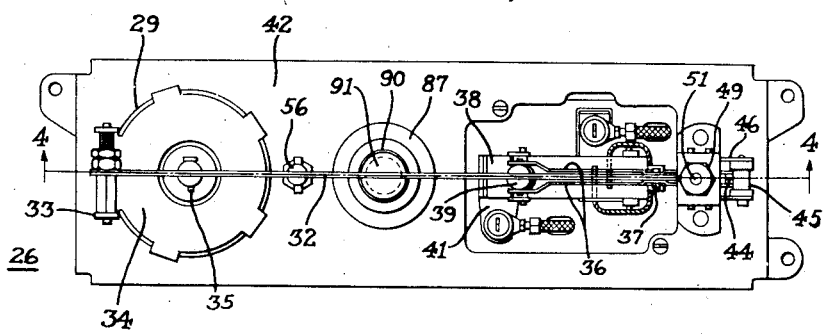
Fig. 6 is a top plan view of the control switch shown in Fig. 4.

The resistance means in the form of a spring 90 is interposed between the auxiliary bellows 87 and a bearing portion 91 formed on the lower side of the control switch lever 32. This spring 90 may contact with lever 32 at all times if desired, but its tension must, during normal operating conditions, be overcome by the switch spring 57. Thereby during normal operation the bellows 87 and spring 90 are ineffective for resisting the downward movement of switch lever 32. Should the temperature outside the compartment 12 increase abnormally or should the temperature of the evaporator be increased abnormally, such as by the insertion thereinto of a warm tray, liquid in the bulb 61 or bulb 62 whichever is affected by such temperature change will expand or vaporize, thus expanding the bellows 70. Movement of the bellows 70 into the housing 73 of either of the thermostat elements 61 or 62 tends to compress the liquid or glycerin in the housing 73 and thus forces this liquid into either of the conduits 64 or 65 leading from the thermostat being affected by the change of temperature from where the liquid flows into conduit 67 and thence into the auxiliary bellows 87 on the control switch 26. The bellows 87 will thus expand into the position shown by the dotted lines in Fig. 5 of the drawings. Spring 90 will obviously be compressed between bellows 87 and lever 32 and will thereby exert or apply increased force or tension against lever 32. Lever 32 will therefore be moved upwardly so that the contacts 38 and 41 of switch 26 will be closed to start the motor 24. If the contacts 38 and 41 are already in closed position as shown in Fig. 5 of the drawings, the bellows 87 and spring 90 will keep them in this position until the temperature of the evaporator 19 or the temperature in the compartment 12 has been reduced to the desired low limit to cause bellows 29 to control switch 26 to overcome the force exerted by the springs 57 and 90 so as to operate the switch 26 into contact open position as shown in Fig. 4 of the drawings. It is apparent that operation of the means just described for modifying the action of the control switch will cause longer operating periods of the refrigerant liquefying and circulating unit and that by operating the compressor continuously or over longer periods of time it is apparent that the evaporator will be reduced below its normal low temperature limit to provide increased cooling for quickly freezing substances placed therein or for maintaining the compartment 12 at a constant low temperature irrespective of abnormal increases in temperature on the exterior of the refrigerating compartment. Thus, the refrigerating system is rendered more efficient by the fact that it operates normally when the temperature of the evaporator or the temperature within the room is normal and when the temperature of the evaporator or the room increases, the system will produce increased cooling automatically to maintain a constant low temperature without abnormal starting and stopping operations.

Occasionally it occurs that the temperature of the evaporator or the temperature within the insulated food storage compartment 12 is desired to be lowered below their normal low temperature for a predetermined period of time irrespective of the temperature prevailing in the compartment 12 or on the exterior thereof. For instance this may be desirable when a quantity of bottled beverages are placed in compartment 12 to be rapidly cooled in order that the contents thereof may be served within a short period of time. When a requirement of the type just described occurs the pointer or handle 84 of the manually operated means 63 is manipulated into a desired position as indicated on the dial 85 and expands bellows 76. Expansion of bellows 76 tends to compress the liquid in housing 75 and this liquid then flows into conduits 66 and 67 and thence into the auxiliary bellows 87. Bellows 87 is thereby caused to expand to compress spring 90 which will then apply increased force or tension upon the control switch lever 32. The action of switch 26 is thereby manually modified in the same manner as heretofore described with reference to the expansion of the thermostatic elements 61 and 62.

The two automatic thermostatic elements 61 and 62 together with the manually operated means 63 for modifying the action of the control switch 26, and consequently operations of the refrigerant liquefying and circulating unit, may operate or be actuated independently of one another and independently of the normal adjustable setting of the control switch 26. Thus it is apparent that I have provided an improved refrigerating system wherein the action of the control switch of the system can be temporarily modified to cause continuous or longer operating periods of the refrigerant liquefying elements of the system. While certain elements of my system for modifying the action of the control switch of the system, either manually or automatically in response to temperature of substances placed in the evaporator to be frozen or to temperatures outside the refrigerated compartment may have been heretofore used individually, the combination of these elements in the one system provides an improved refrigerating system which will operate efficiently under various conditions thus producing results unobtainable with the use of either element alone. My improved refrigerating system will maintain a uniform low temperature in a refrigerated compartment, irrespective of abnormal increases in temperature on the exterior thereof, while at the same time automatically providing increased cooling of the evaporator, when water or other comestibles are to be frozen, and also provides for rapidly cooling articles such as bottled beverages placed in the refrigerator, the contents of which are to be served in a short period of time. By accomplishing the foregoing features without the necessity of frequently starting and stopping the refrigerant liquefying and circulating unit the life of operating parts of the system is prolonged.

While the form of embodiment of the invention as herein disclosed, constitutes a preferred form, it is to be understood that other forms might be adopted, all coming within the scope of the claims which follow.

What is claimed is as follows:

1. Refrigerating apparatus comprising in combination, an insulated compartment to be cooled, an evaporator disposed in said compartment, means for circulating refrigerant medium through the evaporator, control means for automatically controlling the circulating means to maintain said evaporator at a normal predetermined mean temperature, means for automatically modifying the operation of the control means in response to temperatures outside said compartment, and means for automatically modifying the operation of the control means in response to temperatures of the evaporator, both of said last named means including means communicating with the control means for transmitting movement of either of the last two mentioned means to said control means to change the temperature of the evaporator.

2. Refrigerating apparatus comprising in combination, an insulated compartment to be cooled, an evaporator disposed in said compartment, means for circulating refrigerant medium through the evaporator, control means for automatically controlling the circulating means to maintain said evaporator at a normal predetermined mean temperature, means for automatically modifying the operation of the control means in response to temperatures outside said compartment, means for automatically modifying the operation of the control means in response to temperatures of the evaporator, and manually operable means for modifying the operation of the control means, the two said automatic means and said manual means for modifying operations of the control means being operable independently of one another to change the temperature of said evaporator.

3. Refrigerating apparatus comprising in combination, a compartment to be cooled, an evaporator disposed in said compartment, cyclically operated means for circulating a refrigerating medium through said evaporator, control means for automatically controlling the operating cycles of said first named means including means for adjusting same to normally maintain a predetermined mean temperature of the evaporator, and means operable automatically and independent of the adjustable means for modifying the operation of said control means, said last named means including a means responsive to temperatures outside said compartment and another means responsive to temperatures of said evaporator.

4. Refrigerating apparatus comprising in combination, a compartment to be cooled, an evaporator disposed in said compartment, means for cyclically circulating a refrigerating medium through said evaporator, control means for automatically controlling the circulating cycles of said first named means including means for adjusting same to normally maintain a predetermined mean temperature of the evaporator, means operable automatically in response to temperatures outside said compartment for modifying the operation of said control means, means communicating with said last named means and operable automatically in response to temperatures of said evaporator for modifying the operation of said control means, and manually operable means for modifying the operation of said control means, the two said automatic means and said manually operated means for modifying operations of the control means being operable independently of one another and independently of the adjustable means of said control means.

5. Refrigerating apparatus including a compartment and mechanism for producing refrigeration therein; control means for automatically controlling said mechanism for maintaining the temperature within said compartment within predetermined limits; auxiliary means for modifying the action of said control means to change the lower temperature limit within said compartment while maintaining the upper temperature limit unchanged, means for operating said auxiliary means automatically in response to temperatures outside said compartment, means for operating said auxiliary means automatically in response to the temperature of said evaporator, manually actuated means for operating said auxiliary means; the two said automatic means and the said manual means for operating said auxiliary means being operated independently of one another.

6. Refrigerating apparatus comprising in combination, a compartment to be cooled, an evaporator disposed in said compartment, means for circulating refrigerant medium through the evaporator, control means for automatically controlling the circulating means to maintain said evaporator at a normal predetermined mean temperature, and means for automatically modifying the operation of the control means, said last means including a thermostat responsive to temperatures outside said compartment and another thermostat responsive to the temperature of the evaporator, said last named means also including a conduit communicating with the thermostats and containing a liquid for hydraulically transmitting movements of the thermostats to said means for modifying the operation of said control means.

7. Refrigerating apparatus comprising in combination, a compartment to be cooled, an evaporator disposed in said compartment, means for circulating refrigerant medium through the evaporator, control means for automatically controlling the circulating means to maintain said evaporator at a normal predetermined mean temperature, and means for automatically modifying the operation of the control means, said last named means including an expansible and contractible thermostatic element responsive to temperatures outside said compartment and another expansible and contractible thermostatic element responsive to temperatures of the evaporator, said last named means also including a conduit communicating with the thermostatic elements and containing a non-freezable liquid for hydraulically transmitting movement of the thermostatic elements to said means for modifying the operation of said control means.

8. A refrigerating apparatus comprising in combination, a cabinet, an evaporator disposed in said cabinet for cooling the same, a refrigerant liquefying and circulating unit operatively connected to said evaporator, a switch having positions for starting and stopping said unit to normally maintain said evaporator between predetermined temperature limits, means for actuating said switch from one of its positions to the other, a flexible member operated automatically in response to normal conditions of said evaporator for actuating said switch actuating means, and a second flexible member for effecting the action of said switch actuating means to modify the operation of said unit to cause the temperature of said evaporator to vary from the normal predetermined temperature limits thereof, said second named flexible member being normally ineffective and rendered effective automatically either in response to a different refrigerating requirement within said cabinet or in response to conditions exteriorly of said cabinet.

9. Refrigerating apparatus comprising in combination, an insulated compartment to be cooled, an evaporator disposed in said compartment, means for circulating refrigerant medium through the evaporator, control means for automatically controlling the circulating means to maintain said evaporator at a normal predetermined mean temperature, means for automatically modifying the operation of the control means in response to temperatures outside said compartment, and means for automatically modifying the operation of the control means in response to temperatures of the evaporator.

10. Refrigerating apparatus comprising in combination, an insulated compartment to be cooled, an evaporator disposed in said compartment, a refrigerant liquefying unit operatively connected with said evaporator for circulating refrigerant therethrough, adjustable means for automatically controlling the refrigerant liquefying and circulating unit to maintain said evaporator at a normal predetermined mean temperature, means for automatically modifying the operation of said refrigerant liquefying and circulating unit in response to temperatures outside said compartment, and means for automatically modifying the operation of the refrigerant liquefying and circulating unit in response to temperatures of the evaporator.

11. Refrigerating apparatus comprising in combination, an insulated compartment to be cooled, an evaporator disposed in said compartment, a refrigerant liquefying unit operatively connected with said evaporator for circulating refrigerant therethrough, adjustable means for automatically controlling the refrigerant liquefying and circulating unit to maintain said evaporator at a normal predetermined mean temperature, means for automatically modifying the operation of said refrigerant liquefying and circulating unit in response to temperatures outside said compartment, means for automatically modifying the operation of said refrigerant liquefying and circulating unit in response to temperatures of the evaporator, and manually operable means for modifying the operation of the refrigerant liquefying and circulating unit.

LLOYD M. KEIGHLEY.